US012801977B2

(12) United States Patent
Forouzandehmehr et al.

(10) Patent No.: US 12,801,977 B2
(45) Date of Patent: Nov. 17, 2026

(54) SYSTEMS AND METHODS FOR GENERATING A CUSTOMIZED GUI

(71) Applicant: Walmart Apollo, LLC, Bentonville, AR (US)

(72) Inventors: Najmeh Forouzandehmehr, Saratoga, CA (US); Evren Korpeoglu, San Jose, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1144 days.

(21) Appl. No.: 17/589,306

(22) Filed: Jan. 31, 2022

(65) Prior Publication Data

US 2023/0244983 A1 Aug. 3, 2023

(51) Int. Cl.

| | |
|---|---|
| ***G06Q 30/0601*** | (2023.01) |
| ***G06F 16/835*** | (2019.01) |
| ***G06F 16/838*** | (2019.01) |
| ***G06N 20/00*** | (2019.01) |

(52) U.S. Cl.

CPC ......... *G06N 20/00* (2019.01); *G06F 16/8365* (2019.01); *G06F 16/838* (2019.01); *G06Q 30/06314* (2025.08)

(58) Field of Classification Search

CPC ... G06N 20/00; G06F 16/8365; G06F 16/838; G06Q 30/06314

See application file for complete search history.

(56) References Cited

U.S. PATENT DOCUMENTS

| | | | | |
|---|---|---|---|---|
| 8,290,818 | B1 * | 10/2012 | Levitan .............. | G06Q 30/0631 705/26.7 |
| 9,959,563 | B1 * | 5/2018 | Wu .................... | G06Q 30/0631 |
| 2001/0021914 | A1 | 9/2001 | Jacobi | |

(Continued)

FOREIGN PATENT DOCUMENTS

| | | |
|---|---|---|
| WO | 2021202119 | 10/2021 |

OTHER PUBLICATIONS

Chen, W., et al., "Ranking Measures and Loss Functions in Learning to Rank," Microsoft Research Asia & Chinese Academy of Sciences, 2009 (9 pgs) 2009.

(Continued)

*Primary Examiner* — Sanchita Roy

(74) *Attorney, Agent, or Firm* — FOLEY & LARDNER LLP

(57) ABSTRACT

Systems and methods including one or more processors and one or more non-transitory computer-readable storage devices storing computing instructions configured to run on the one or more processors and cause the one or more processors to perform functions comprising determining one or more similar items similar to an item; determining one or more complementary items complementary to both the one or more similar items and the item; applying one or more labels to the one or more complementary items based on a rank of the one or more complementary items; training a predictive algorithm on the one or more labels; receiving a request to generate a customized graphical user interface (GUI) for the item; and coordinating displaying the customized GUI for the item using the predictive algorithm. Other embodiments are disclosed herein.

20 Claims, 5 Drawing Sheets

(56) References Cited

U.S. PATENT DOCUMENTS

| | | | |
|---|---|---|---|
| 2019/0205905 A1 | 7/2019 | Raghunathan et al. | |
| 2020/0104898 A1* | 4/2020 | Cui | G06Q 30/0633 |
| 2021/0090154 A1 | 3/2021 | Michaelson et al. | |
| 2021/0233151 A1 | 7/2021 | Rahman et al. | |
| 2021/0241343 A1 | 8/2021 | Arora et al. | |
| 2023/0162258 A1* | 5/2023 | Das Gupta | G06Q 30/0633 705/26.7 |
| 2025/0077934 A1* | 3/2025 | Shamir | G06N 20/00 |

OTHER PUBLICATIONS

Felicioni, Nicolo, Maurizio, Ferrari Dacrema, and Paolo Cremonesi. "Measuring the user satisfaction in a recommendation interface with multiple carousels." Proceedings of the 2021 ACM International Conference on Interactive Media Experiences. 2021. (Year: 2021) 2021.

* cited by examiner

SYSTEMS AND METHODS FOR GENERATING A CUSTOMIZED GUI

TECHNICAL FIELD

This disclosure relates generally to graphical user interfaces (GUIs) and more particularly relates to generating custom GUIs for complementary items.

BACKGROUND

Machine learning algorithms (e.g., unsupervised learning, deep learning, supervised learning, etc.) are becoming more commonplace in today's computer systems, but many data scientists and software engineers continue to encounter problems while training novel algorithms. One problem encountered when training machine learning algorithms is a lack of adequate amounts of representative training data. Machine learned algorithms trained on problematic training data suffer from a number of flaws. For example, machine learned algorithms trained on an insufficient amount of data can be inaccurate and, depending on the content of the training data, can overpredict or underpredict outcomes. Further, machine learned algorithms trained on non-representative training data can be skewed due to a unique event in the training data. These inaccuracies can also pose problems for machine learned algorithms used for automatic purchases (e.g., automated trading algorithms, search engine marketing algorithms, etc.), as a severely overpredicted outcome can lead to recurring overpayments.

In the past, solutions to this problem of poor or insufficient amounts of training data have been simply to (1) gather more training data, (2) purchase higher quality training data sets from a vendor, or (3) use a pre-trained model. Each of these past solutions had their own limitations. In many instances, gathering more training data can be time consuming due to the large corpus of signals need to accurately train a machine learning model. Purchasing training data can also pose problems, as these training datasets can be expensive and can become outdated quickly. The disadvantages of pre-trained models are similar to those seen with purchased training data, as pre-trained models can also be expensive when they are bespoke and can become outdated quickly without updating or re-training. Further, signals that have not been seen before by a model or are new can be misclassified by a model (pre-trained or not) due to a lack of representation in training data (either gathered or purchased). Therefore, there is a need for a system and method to bootstrap training of a machine learning algorithm.

BRIEF DESCRIPTION OF THE DRAWINGS

To facilitate further description of the embodiments, the following drawings are provided in which.

Figure 1:
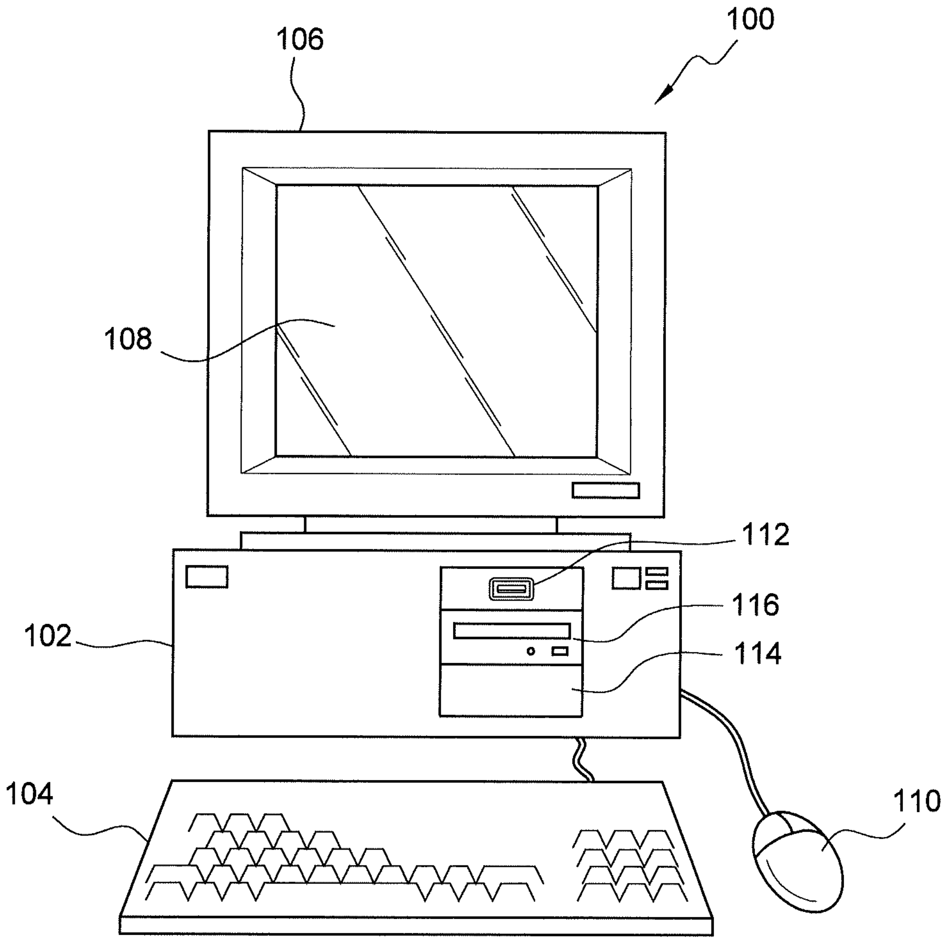
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and cause the one or more processors to to perform functions comprising determining one or more similar items similar to an item; determining one or more complementary items complementary to both the one or more similar items and the item; applying one or more labels to the one or more complementary items based on a rank of the one or more complementary items; training a predictive algorithm on the one or more labels; receiving a request to generate a customized graphical user interface (GUI) for the item; and coordinating displaying the customized GUI for the item using the predictive algorithm.

Various embodiments include a method. The method can be implemented via execution of computing instructions configured to run at one or more processors and configured to be stored at non-transitory computer-readable media The method can comprise determining one or more similar items similar to an item; determining one or more complementary items complementary to both the one or more similar items and the item; applying one or more labels to the one or more complementary items based on a rank of the one or more complementary items; training a predictive algorithm on the one or more labels; receiving a request to generate a customized graphical user interface (GUI) for the item; and coordinating displaying the customized GUI for the item using the predictive algorithm.

Figure 2:
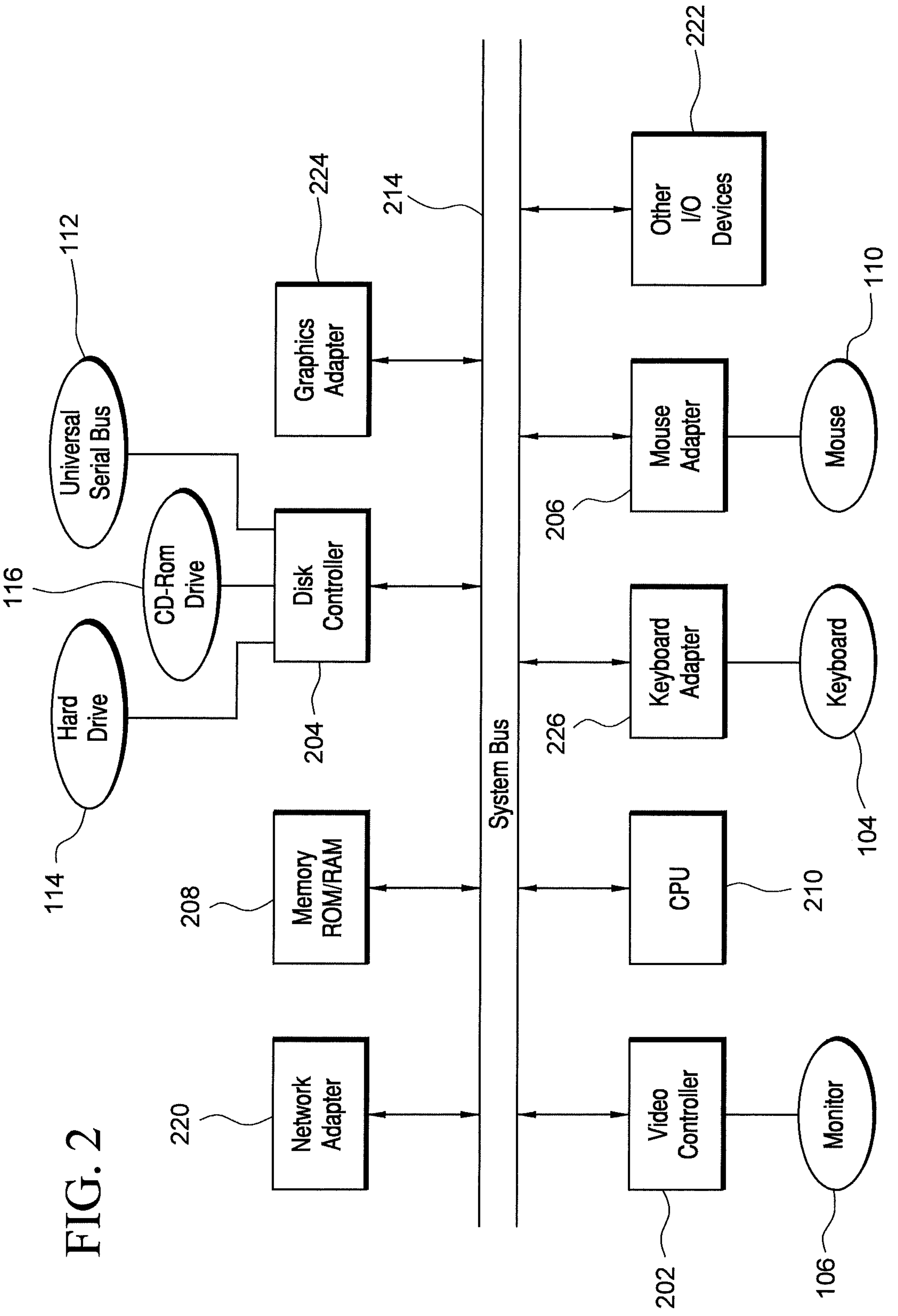
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
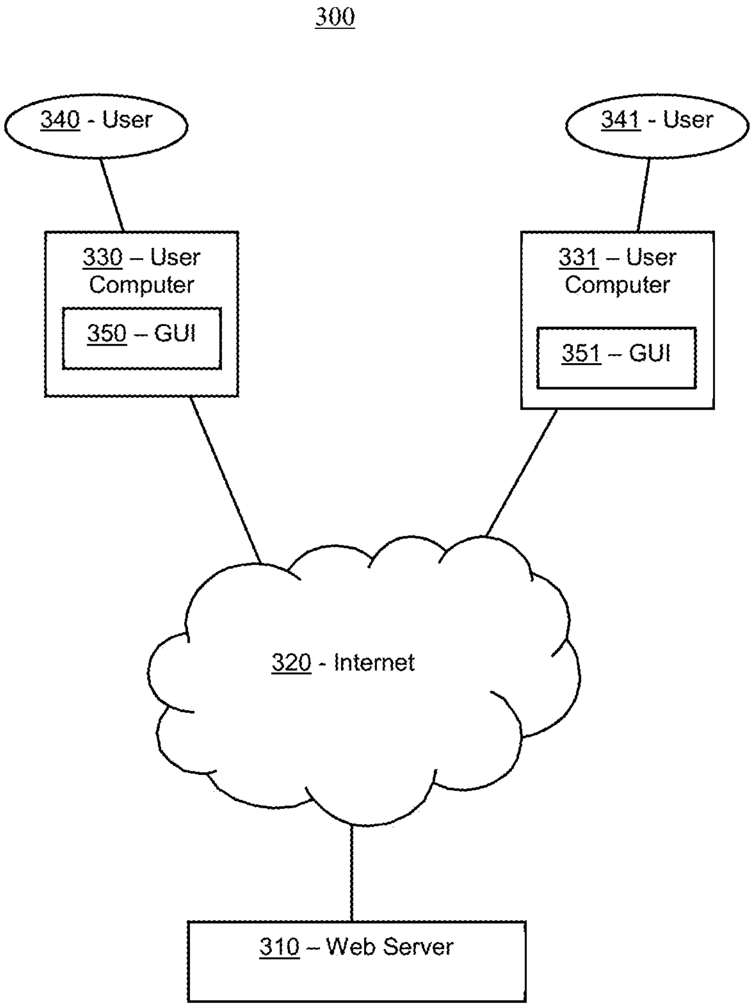
FIG. 3 illustrates a representative block diagram of a system, according to an embodiment.

Turning ahead in the drawings, FIG. 3 illustrates a block diagram of a system 300 that can be employed for generating a customized GUI, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310 and/or one or more user computers 330, 331. Web server 310 and/or user computers 330, 331 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310 and/or user computers 330, 331. Additional details regarding web server 310 and/or user computers 330, 331 are described herein.

In some embodiments, user computers 330, 331 are external to system 300. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons. In various embodiments, user computers 330, 331 can comprise a display that is smaller than monitor 106 (FIG. 1), thereby facilitating mobility.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interface ("GUI") 350, 351. In the same or different embodiments, GUI 350, 351 can be part of and/or displayed by user computers 330, 331. In some embodiments, GUI 350, 351 can comprise text and/or graphics (image) based user interfaces. In the same or different embodiments, GUI 350, 351 can comprise a heads up display ("HUD"). When GUI 350, 351 comprises a HUD, GUI 350, 351 can be projected onto a medium (e.g., glass, plastic, etc.), displayed in midair as a hologram, or displayed on a display (e.g., monitor 106 (FIG. 1)). In various embodiments, GUI 350, 351 can be color, black and white, and/or greyscale. In many embodiments, GUI 350, 351 can comprise an application running on a computer system, such as computer system 100 (FIG. 1), user computers 330, 331, and/or web server 310. In the same or different embodiments, GUI 350, 351 can comprise a website accessed through internet 320. In some embodiments, GUI 350, 351 can comprise an eCommerce website. In these or other embodiments, GUI 350, 351 can comprise an administrative (e.g., back end) GUI allowing an administrator to modify and/or change one or more settings in system 300. In the same or different embodiments, GUI 350, 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 310 and/or user computers 330, 331 can be in data communication with each other through Internet 320. In many embodiments, web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310, and/or user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 310, and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310, and/or user computers 330, 331. In a similar manner, the processing module(s) and the memory storage module(s) can be local and/or remote to each other.

In some embodiments, user computers 33, 331 also can be referred to as customer computers. Internet 320 can be an intranet that is not open to the public. In further embodiments, Internet 320 can be a mesh network of individual systems. Accordingly, in many embodiments, web server 310 (and/or the software used by such systems) can refer to a back end of system 300 operated by an operator and/or administrator of system 300, and user computers 330, 331 (and/or the software used by such systems) can refer to a front end of system 300 used by one or more users 340, 341, respectively. In some embodiments, users 340, 341 can also be referred to as customers, in which case, user computers 33, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310, and/or user computers 330, 331 also can be configured to communicate with one or more databases. The one or more databases can comprise a product database that contains information about products, items, or SKUs (stock keeping units) sold by a retailer. In many embodiments, one or more databases can comprise information about interactions of user computers 330, 331 with GUIs 350, 351. For example, the one or more databases can store past (e.g., historical) interactions of user computers 330, 331 with GUIs 350, 351. These interactions can be tied to a unique identifier (e.g., an IP address, an advertising ID, device ID, etc.) and/or a user account. In embodiments where a user 340, 341 interacts with GUIs 350, 351 before logging into a user account, data stored in the one or more database that is associated with a unique identifier can be merged with and/or associated with data associated with the user account. In some embodiments, data can be deleted from a database when it becomes older than a maximum age. In many embodiments, a maximum age can be determined by an administrator of system 300. In various embodiments, data collected in real-time can be streamed to a database for storage.

In many embodiments, one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s). In various embodiments, databases can be stored in a cache (e.g., MegaCache) for immediate retrieval on-demand.

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, and/or user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for automatic generation of customized GUIs without historical data for an item of interest. These techniques described herein can provide a significant improvement over conventional approaches of generating customized GUIs, such as purchasing training data and/or using a pre-trained model. In many embodiments, the techniques described herein can beneficially make determinations based on dynamic information that describes current conditions and/or conditions that have occurred during the same day of the request to generate the customized GUI. In this way, the techniques described herein can avoid problems with lack of training data by continually updating.

In a number of embodiments, the techniques described herein can solve a technical problem that arises only within the realm of computer networks, as customized GUIs do not exist outside the realm of computer networks.

In many embodiments, the techniques described herein can solve a technical problem in a related field that cannot be solved outside the context of computer networks. Specifically, the techniques described herein cannot be used outside the context of computer networks due to a lack of data and because the machine learning model cannot be performed without a computer system and/or network.

Figure 4:
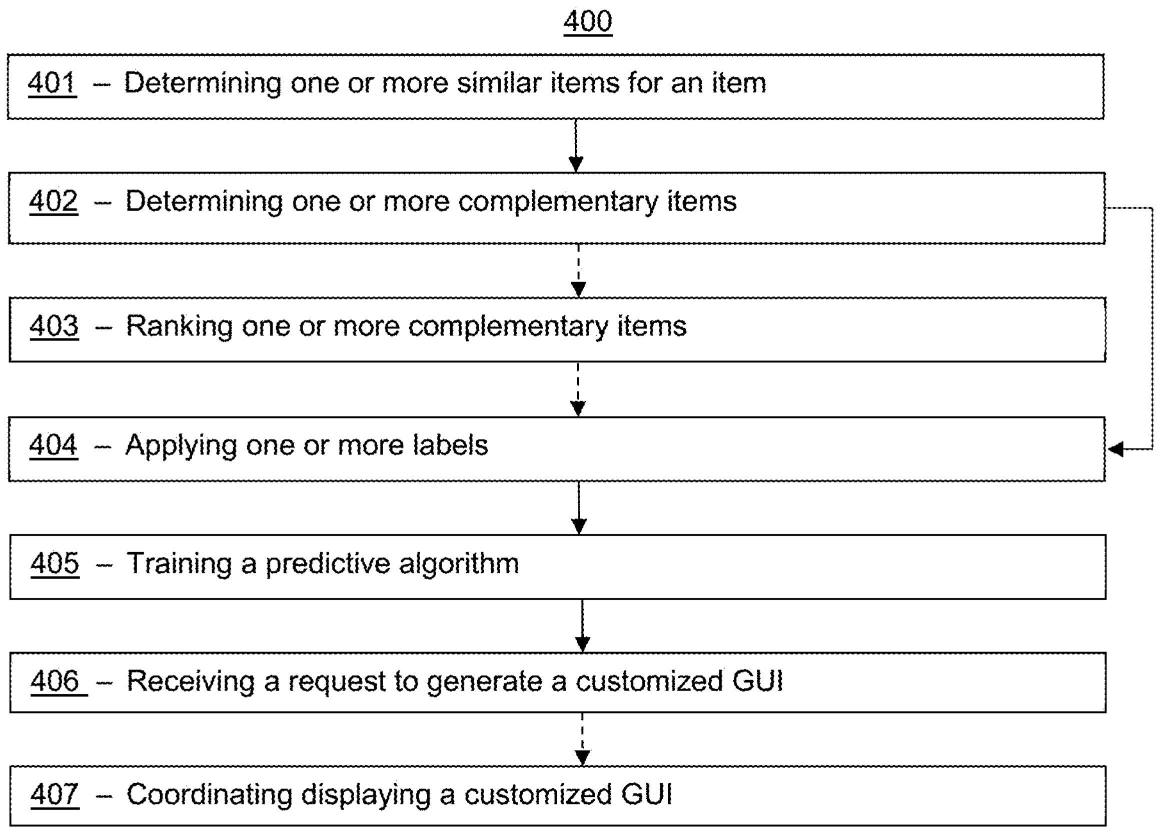
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 and/or user computers 330, 331 (FIG. 3). The processing module(s) can be similar or identical to the processing module(s) described above with respect to computer system 100 (FIG. 1).

In many embodiments, method 400 can comprise an activity 401 of determining one or more similar items for an item (i.e., an item of interest). In many embodiments, an item of interest can comprise an item that is new to system 300 (FIG. 3). In these or other embodiments, an item of interest can have no or a limited amount of historical interaction and/or purchase data.

Generally speaking, a similar item can be considered a substitute for an item of interest. In many embodiments, a similar item can be a same type of item, be from a different manufacturer, in a different volume/lot, etc. For example, a 12 pack of toilet paper can be considered a substitute for a 24 pack of toilet paper, or a red and white blouse can be considered a substitute for a dark pink and white blouse. A number of different algorithms exist for identifying similar items. For example, two items can be similar to each other when they are viewed during the same browsing session, but only one of the two items is purchased. As another example, U.S. Provisional App. Ser. No. 63/304,897, filed Jan. 31, 2022, which is incorporated herein by this reference in its entirety, describes an exemplary similar item algorithm. In many embodiments, a similar item algorithm can generate one or more item similarity metrics. In some embodiments, items can be determined to be similar to each other when their similarity metric is above a predetermined threshold and/or when their similarity rank (e.g., a ranking of similarity scores) is above a predetermined rank.

In many embodiments, method 400 can comprise an activity 402 of determining one or more complementary items. In some embodiments, activity 402 can be performed concurrently and/or as a part of activity 401. Generally speaking, a complementary item can be considered an add-on purchase for an item. For example, a TV stand can be considered complementary to a TV, but not similar to a TV. A number of different algorithms exist for identifying complementary items. For example, two items can be complementary to each other when they are often bought together. As another example, U.S. Provisional App. Ser. No. 63/304,897, filed Jan. 31, 2022, which is incorporated herein by this reference in its entirety, describes an exemplary complementary item algorithm. In many embodiments, a complementary item algorithm can generate one or more complementary item metrics. In some embodiments, items can be determined to be complementary to each other when their complementary item metric is above a predetermined threshold and/or when their similarity rank (e.g., a ranking of similarity scores) is above a first predetermined similarity rank (but below a second predetermined similarity rank required for the two items to be considered similar to each other). In many embodiments, complementary items can be determined for one or more similar items (e.g., items determined to be similar to an item of interest in activity 401, above). In this way, a complementary signal for an item of interest (e.g., an item with little to no history) can be created.

In some embodiments, method 400 can optionally comprise activity 403 of ranking one or more complementary items. In many embodiments, one or more complementary items can be ranked based on their complementary item score (e.g., a higher score is ranked higher or lower, or a lower score is ranked higher or lower). In some embodiments, a predetermined threshold rank can be set by an administrator of system 300 (FIG. 3).

In many embodiments, method 400 can comprise an activity 404 of applying one or more labels. In some embodiments, activity 404 can be performed in response to and/or after activity 403. In various embodiments, a positive and/or a negative label can be applied to one or more complementary items. For example, a complementary item ranked below a predetermined threshold can be marked with a negative label and a complementary item ranked above a predetermined threshold can be marked with a positive label. In this way, a complementary item signal can be converted into a form that is more suitable for ingestion by a machine learning algorithm.

In many embodiments, method 400 can comprise an activity 405 of training a predictive algorithm. In some embodiments, a predictive algorithm can comprise a machine learning algorithm. A number of different types of machine learning algorithms can be used here. For example, machine learning algorithms used in method 400 can be at least partially supervised (e.g., use labeled training data) and/or be at least partially unsupervised (e.g., use un-labeled training data). In these or other embodiments, a machine learning algorithm can comprise a learning to rank algorithm. Generally speaking, a learning-to-rank algorithm can be configured to generate a ranked list and/or ranked sequence of items. This algorithm can be differentiated from other types of machine learning algorithms that solve instead for a classification of an item. In many embodiments, one or more items can be ranked by a loss computed by the predictive algorithm. Generally speaking, a loss function (also known as a cost function) can comprise a function that maps an event or values of one or more variables (e.g., whether an item is a complement to an item of interest) onto a real number. In many embodiments, this real number can represent some type of "cost" associated with an event. A number of different types of loss functions can be used here. For example, a pointwise loss, pairwise loss, and/or listwise loss can be used. In some embodiments, a top N number of items (e.g. complementary and/or similar items) as ranked by one or more loss functions can be selected for display on a customized GUI.

In some embodiments, training a predictive algorithm can comprise estimating internal parameters of a model configured to generate a customized GUI. In various embodiments, a predictive algorithm can be trained using labeled training data, otherwise known as a training dataset. In many embodiments, a training dataset can comprise data about one or more labeled complementary items. In this way, a predictive algorithm can be configured to identify other complementary items by increasing weights for positive signals while decreasing weights for negative signals. In the same or different embodiments, a pre-trained predictive algorithm can be used, and the pre-trained algorithm can be re-trained on the labeled training data. In some embodiments, the predictive model can also consider both historical and dynamic input from a ranking of complementary items. In this way, a predictive algorithm can be trained iteratively as data from an eCommerce website is added to a training data set. For example, a predictive algorithm can be re-trained on newly gathered interaction data. In various embodiments, an interaction can comprise an interaction with a GUI, as described with reference to FIG. 3. In various embodiments, interactions can be associated with a user. In these or other embodiments, interactions associated with a user can be used to practice embodiments of the invention that are customized and/or tailored to the user.

In many embodiments, a predictive algorithm can be iteratively trained in real time as data is added to a training data set. In various embodiments, a predictive algorithm can be trained, at least in part, on a single user's (e.g., user 340) interaction data or the single user's interaction data can be weighted in a training data set. In this way, a predictive algorithm tailored to a single user can be generated. In the same or different embodiments, a predictive algorithm tailored to a single user can be used as a pre-trained algorithm for a similar user. In several embodiments, due to a large amount of data needed to create and maintain a training data set, a predictive model can use extensive data inputs to determine other complementary items. Due to these extensive data inputs, in many embodiments, creating, training, and/or using a predictive algorithm configured to determine other complementary items cannot practically be performed in a mind of a human being. A number of different signals about a complementary item can be used to train a predictive algorithm. For example, a training dataset can contain a data describing an item similarity score (e.g., as determined in activity 401), a complementary item score (e.g., as determined in activity 402), a classification category for an item (e.g., sporting goods, electronics, grocery, etc.), views of an item by one or more users, purchases of an item by one or more users, a price similarity score between two items, and/or a title similarity score between two items.

In many embodiments, a price similarity score can be calculated using an absolute difference between prices or log ratio of prices for two items. In some embodiments, a log ratio can be calculated by taking a log of a first price divided by a second price. In many embodiments, a log ration can be calculated using the equation below:

$$\text{price ratio} = \log\frac{\text{price 1}}{\text{price 2}}$$

In some embodiments a title similarity score can be calculated using Jaccard similarity between titles of two items. Generally speaking, a Jaccard similarity can quantify a number of words that appear in two or more titles and/or how many words are not shared between two or more titles. A Jaccard similarity can be calculated in a number of ways. For example, word embeddings (words converted into vectors) can be used to calculate the score. In many embodiments, word embeddings can be created using one or more natural language processing algorithms (e.g., a Word2vec algorithm).

In many embodiments, method 400 can comprise an activity 406 of receiving a request to generate a customized GUI. In these or other embodiments, a request to generate a customized GUI can comprise a request to navigate to the customized GUI on a web browser. For example, a user computer 330 (FIG. 3) can transmit a request to navigate to a customized GUI via a web browsing program. In some embodiments, activity 406 can trigger the performance of one or more of activities 402-405 and/or activity 407. In various embodiments, a request to generate a customized GUI can comprise a request to purchase an item (e.g., the item in activity 401).

In many embodiments, method 400 can comprise an activity 407 of coordinating displaying a customized GUI. In many embodiments, a customized GUI can comprise a GUI displaying one or more items complementary to an item of interest. In some embodiments, an item of interest can have no historical data linking it to a complementary item. For example, an item of interest may have never been purchased with a complementary item in the past. In some embodiments, a plurality of highest ranked complementary items can be displayed in an animated web element. In various embodiments, an animated web element can cycle through each complementary item automatically. In many embodiments, a complementary item displayed in activity 407 can be determined using one or more feature weights generated by a predictive algorithm. In these embodiments, feature weights can be applied to an item using a dot product of feature values (X) and feature weights (W). In these embodiments, a feature weight can be calculate using an expression comprising $W_1*X_1+W_2*X_2+[\ldots]+W_{N+}*X_N$. In various embodiments, a sigmoid function can be used to normalize a result of a dot product, thereby making it easier to interpret. When this normalize result is above e predetermined threshold, an item can be deemed a complementary item for an item of interest.

Figure 5:
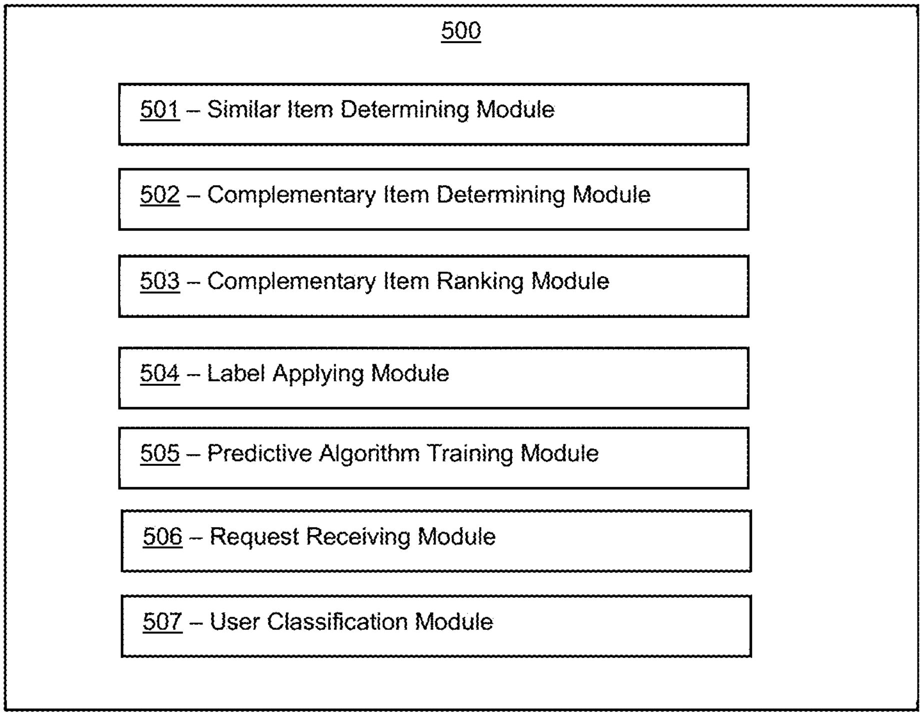
FIG. 5 illustrates a representative block diagram of a system, according to an additional embodiment.

Turning ahead in the drawings, FIG. 5 illustrates a block diagram of a system 500 that can be employed for behavior based messaging. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules (i.e., software and/or hardware) of system 500. In some embodiments, one or more portions of system 500 can be part of or in communication with web server 310 (FIG. 3) and/or user computers 330, 331. (FIG. 3).

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as similar item determining module 501. In many embodiments, similar item determining module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as complementary item determining module 502. In many embodiments, complementary item determining module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as complementary item ranking module 503. In many embodiments, complementary item ranking module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as label applying module 504. In many embodiments, label applying module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as predictive algorithm training module 505. In many embodiments, predictive algorithm training module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as request receiving module 506. In many embodiments, request receiving module 506 can store computing instructions configured to run on one or more processing modules and perform one or more acts of method 400 (FIG. 4) (e.g., activity 406 (FIG. 4)).

In many embodiments, system 500 can comprise non-transitory memory storage module 507. Memory storage module 507 can be referred to as display coordination module 507. In many embodiments, display coordination module 507 can store computing instructions configured to run on one or more processing modules and perform one or more acts of method 400 (FIG. 4) (e.g., activity 407 (FIG. 4)).

Although systems and methods for generating a customized GUI have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system, comprising:

one or more processors; and one or more non-transitory computer-readable storage devices storing computing instructions configured to run on the one or more processors and cause the one or more processors to:

determine one or more similar items similar to an item;

determine one or more complementary items complementary to both the one or more similar items and the item based on a complementary metric for a complementary item, of the one or more complementary items, and the item satisfying a threshold and without utilizing historical purchase data for the item;

convert one or more complementary item signals into a form used by a machine learning algorithm by applying one or more labels to the one or more complementary items based on a rank of the one or more complementary items;

train the machine learning algorithm on the one or more labels;

receive a request to generate a customized graphical user interface (GUI) for the item;

coordinate displaying the customized GUI, for the item, using the machine learning algorithm; and retrain, after training the machine learning algorithm on the one or more labels, the machine learning algorithm in real-time based on one or more of an interaction with the customized GUI, data being added to a training data set, or interaction data of a single user.

2. The system of claim 1, wherein applying the one or more labels to the one or more complementary items comprises:

when the rank of the one or more complementary items is above a predetermined threshold, applying a positive label, of the one or more labels, to the one or more complementary items; and when the rank of the one or more complementary items is below the predetermined threshold, applying a negative label, of the one or more labels, to the one or more complementary items.

3. The system of claim 1, wherein machine learning algorithm is based on the one or more labels and one or more of:

a similarity score;
a complementary score;
an item category;
item views; and
item purchases.

4. The system of claim 1, wherein the machine learning algorithm is configured to use listwise ranking loss.

5. The system of claim 1, wherein, to coordinate displaying the customized GUI, the one or more processors are to:

apply one or more feature weights determined by the machine learning algorithm to one or more features of the item; and
coordinate displaying the customized GUI using the one or more feature weights as applied to the one or more features of the item.

6. The system of claim 1, wherein the customized GUI comprises a GUI displaying items complementary to the item.

7. The system of claim 1, wherein the computing instructions are further configured to run on the one or more processors and cause the one or more processors to:

coordinate displaying a second customized GUI using the machine learning algorithm, as re-trained.

8. A method implemented via execution of computing instructions configured to run at one or more processors and configured to be stored at non-transitory computer-readable media, the method comprising:

determining one or more similar items similar to an item;
determining, without utilizing historical purchase data for the item, one or more complementary items complementary to both the one or more similar items and the item based on a complementary metric for a complementary item, of the one or more complementary items, and the item satisfying a threshold;
applying one or more labels to the one or more complementary items based on a rank of the one or more complementary items;
training a predictive algorithm on the one or more labels;
receiving a request to generate a customized graphical user interface (GUI) for the item; and
coordinating displaying the customized GUI for the item using the predictive algorithm.

9. The method of claim 8, wherein applying the one or more labels to the one or more complementary items comprises:

when the rank of the one or more complementary items is above a predetermined threshold, applying a positive label, of the one or more labels, to the one or more complementary items; and
when the rank of the one or more complementary items is below the predetermined threshold, applying a negative label, of the one or more labels, to the one or more complementary items.

10. The method of claim 8, wherein the predictive algorithm comprises a machine learning algorithm.

11. The method of claim 8, wherein the predictive algorithm comprises a learning to rank algorithm.

12. The method of claim 8, wherein training the predictive algorithm comprises:

training the predictive algorithm on the one or more labels and one or more of:
a similarity score;
a complementary score;
an item category;
item views; and
item purchases.

13. The method of claim 8, wherein the predictive algorithm uses listwise ranking loss.

14. The method of claim 8, wherein coordinating displaying the customized GUI using the predictive algorithm comprises:

applying one or more feature weights determined by the predictive algorithm to one or more features of the item; and
coordinating displaying the customized GUI using the one or more feature weights as applied to the one or more features of the item.

15. The method of claim 8, wherein the customized GUI comprises a GUI displaying items complementary to the item.

16. The method of claim 8, further comprising:

identifying one or more interactions with the customized GUI;
retraining the predictive algorithm on the one or more interactions; and
coordinating displaying a second customized GUI using the predictive algorithm, as re-trained.

17. The method of claim 8, further comprising:

retraining, after training the predictive algorithm on the one or more labels applied to the one or more complementary items, the predictive algorithm based on an interaction with the customized GUI.

18. The method of claim 8, wherein determining the one or more complementary items comprises:

determining the one or more complementary items to both the one or more similar items and the item based on the complementary metric, for the complementary item and the item, satisfying the threshold and based on a similarity rank, for the complementary item and the item, being above a predetermined similarity rank.

19. The method of claim 18, wherein determining the one or more complementary items comprises:

determining the one or more complementary items to both the one or more similar items and the item based on the complementary metric, for the complementary item and the item, satisfying the threshold and based on the similarity rank, for the complementary item and the item, being above the predetermined similarity rank and below a different similarity rank required for two items to be considered similar.

20. A non-transitory, computer-readable medium comprising instructions that, when executed by a processing resource, causes the processing resource to:

determine one or more complementary items complementary to both an item and one or more similar items and the item based on a complementary metric for a complementary item, of the one or more complementary items, and the item satisfying a threshold and without utilizing historical purchase data for the item;
train a machine learning algorithm on one or more labels that are applied to the one or more complementary items;
coordinate displaying, using the machine learning algorithm, a customized graphical user interface (GUI) for the item; and
retrain, after training the machine learning on the one or more labels, the machine learning algorithm based on one or more of an interaction with the customized GUI or data being added to a training data set.

* * * * *